May 10, 1949.     G. A. McGEE     2,469,776
STOVE RACK
Filed March 14, 1947     2 Sheets-Sheet 1

INVENTOR.
George A. McGee
BY
Attorneys

May 10, 1949. G. A. McGEE 2,469,776
STOVE RACK
Filed March 14, 1947 2 Sheets-Sheet 2
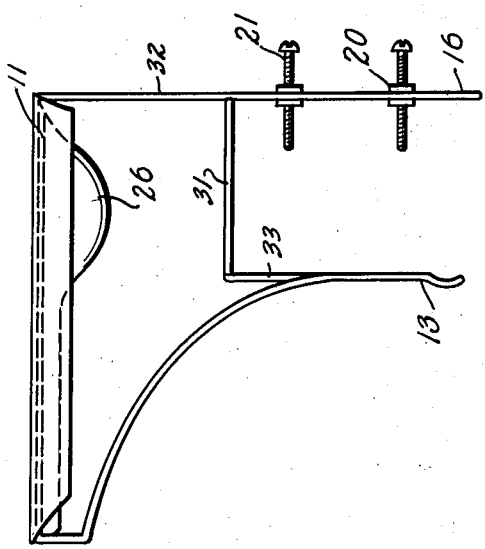
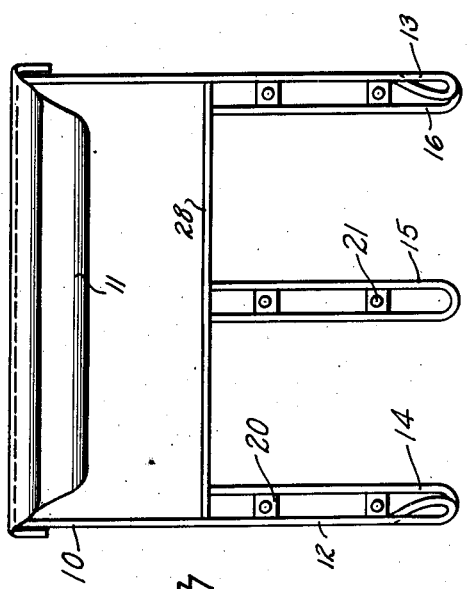
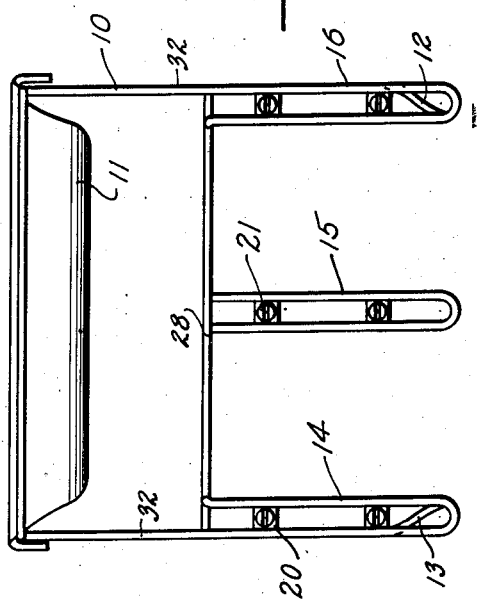
INVENTOR.
George A. McGee Patented May 10, 1949

2,469,776

UNITED STATES PATENT OFFICE 2,469,776

STOVE RACK

George A. McGee, Hartford, Conn.

Application March 14, 1947, Serial No. 734,600

6 Claims. (Cl. 211—90)

This invention relates to improvements in attachments for supporting kitchen utensils on kitchen stoves.

A frequent complaint from housewives is the great amount of walking necessitated in the preparation of meals. It has been estimated that in the daily preparation of meals the ordinary housewife walks miles back and forth among cupboards, stove, refrigerator, sink, and various other appurtenances and adjuncts to the culinary art. It is, of course, impossible to have all implements available at a place where they might be required, and it is a principal object of this invention to provide a rack that may be fastened to the ordinary kitchen stove, whether gas or electric, so that knives, forks, spoons, dishes and other implements may be assembled thereon for the preparation of a meal.

Another object of the invention is to provide a rack that may be easily attached to any form of kitchen stove.

Another object of the invention is to provide a stove rack that is easy to manufacture and that is easy to attach to a stove.

The invention will be described more particularly with the aid of the accompanying drawings, in which:

Figure 3 is a front elevation of the assembled frame and pan.

Figure 4 is a side elevation thereof.

Figure 5 is a rear elevation thereof.

Figure 2:
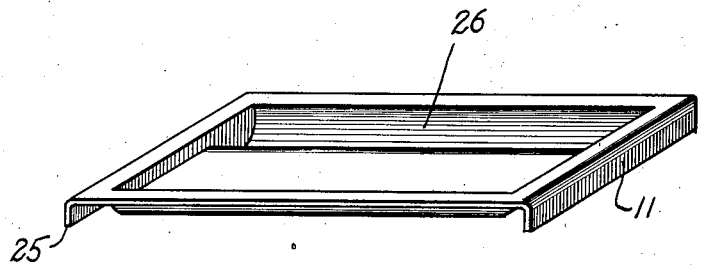
Figure 2 is a perspective view of a pan adapted to fit on top of the frame.

The illustrated rack comprises a frame 10, made preferably of heavy gauge wire. The top of the frame 10 is in the shape of a hollow rectangle adapted to receive a pan or tray 11, to be described more particularly hereinafter. The frame 10 is designed to fit the top of the back of any ordinary kitchen range, gas or electric. With this in view, the frame 10 has two depending front legs 12 and 13, so curved at their lower ends as to abut the front of the vertical surface of the back of the cooking range to which the frame is to be attached. Depending from the rear of the frame 10 are three legs 14, 15 and 16. As shown, the back legs 14, 15 and 16 are U-shaped. Two or more nuts 20 are soldered, or otherwise fastened, between the parallel portions of each leg 14, 15, and 16. A bolt 21 is threaded through each nut 20 and is adapted to bear against the rear vertical surface of the back of the stove for the purpose of bolting the rack securely to the stove. While the illustrated form of the invention shows three back legs, each having two nuts and bolts, it is obvious that a greater or lesser number of legs and fastening devices may be used, as required.

The pan or tray 11 may be made of wood, plastic, or metal, and has depending flanges 25 adapted to fit over the ends of the wire frame 10. The tray has a scooped out portion 26 for the purpose of holding knives, forks, or other articles. This tray may be easily removed for cleaning.

Figure 1:
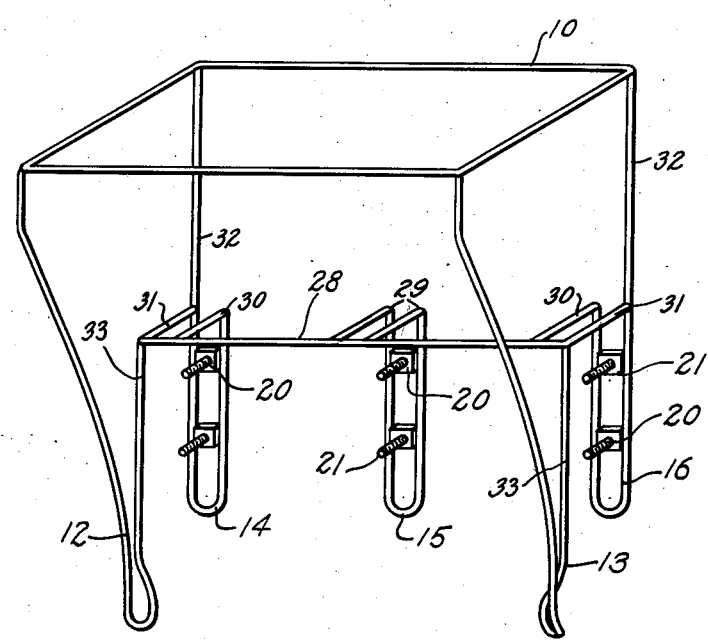
Figure 1 is a perspective view of the rack frame.

It will be observed that the frame 10 is so fashioned that it has a bridge 28 that is adapted to rest on top of the ledge of the stove back. Since the rack and pan are designed to support considerable weight, it will be found desirable to have the bridge 28 consisting of several members. As shown in Figure 1, this bridge comprises horizontal connections 29 on the upper ends of the sides of the intermediate leg 15, horizontal connections 30 on the upper end of one of the sides of the legs 14 and 16, and horizontal connections 31 intermediate the upper and lower ends of the vertical portions 32 of the legs 14 and 16, these connections consisting of forward projections secured to the bridge 28. The ends of the bridge 28 are connected to the upper ends of the vertical return bent portions 33 of the front legs 12 and 13.

To attach the rack, the frame 10 is positioned on the top of the back of the stove in such a manner that the front legs 12 and 13 abut the front of the portion of the stove to which the rack is to be attached with the rear legs 14, 15 and 16 therebehind. The bolts 21 are then screwed forwardly until they abut the rear of the vertical portion of the stove. It is obvious that the length of the screws 21 will depend on the thickness of the back of the stove. If desired, a block of wood or cardboard may be interposed between the bolts 21 and the back of the stove. The bolts or screws 21 are tightened until the rack is firmly attached to the stove.

The frame 10 is so shaped that the upper portion may be either horizontal or slightly inclined to enable the user to find the contents of the tray more easily. The wire of which the frame 10 is constructed is flexible enough to permit bending to attain the desired position.

It will be observed that the front legs 12 and 13 are concave toward the back of the stove. This will reduce the obstruction on top of the stove to a minimum.

What is claimed is:

1. An attachment for a stove comprising a flexible wire frame, a plurality of front legs depending from said frame and having vertical portions adapted to abut the stove, a plurality of rear legs depending from said frame and adapted to be positioned on the opposite side of the stove, each of said rear legs being U-shaped, means fixed between the sides of each U for removably securing the frame to the stove, and a tray removably supported on said frame.

2. An attachment for a stove comprising a flexible wire open frame, a plurality of front legs depending from said frame, each front leg comprising a portion curved rearwardly and a vertical leg member adapted to abut a portion of the stove, a plurality of rear legs depending from said frame and adapted to be positioned on the opposite side of the stove, each of said rear legs being shaped in the form of a vertical U, a plurality of nuts permanently secured between the vertical portions of each rear leg, a bolt threaded through each nut and adapted to secure the frame to the stove, and a tray removably supported on said open frame, said tray having a flange positioned over a portion of said open frame.

3. An attachment for a stove comprising a flexible frame comprising a horizontal open rectangle, front legs depending from said rectangle and adapted to abut the front side of a portion of the stove, rear legs depending from said rectangle and adapted to be positioned behind the said portion of the stove, means on said rear legs for removably engaging the rear of said portion of the stove to secure the attachment in place on the stove.

4. An attachment for a stove comprising a flexible frame comprising a horizontal open rectangle, front legs depending from said rectangle and adapted to abut the front side of a portion of the stove, rear legs depending from said rectangle and adapted to be positioned behind the said portion of the stove, means on said rear legs for removably engaging the rear of said portion of the stove to secure the attachment in place on the stove, and a tray removably supported in said open rectangle.

5. An attachment for a stove comprising a flexible frame having an open top, a plurality of front legs depending from said open top to abut the front of a portion of the stove, a plurality of rear legs depending from said top for positioning at the rear of said stove portion, a horizontal bridge having spaced members connecting said front legs and rear legs and adapted to rest upon said portion of the stove, means on said rear legs for removably securing said frame in place on the stove.

6. An attachment for a stove comprising a flexible frame having an open top, a plurality of front legs depending from said open top to abut the front of a portion of the stove, a plurality of rear legs depending from said top for positioning at the rear of said stove portion, a horizontal bridge having spaced members connecting said front legs and rear legs and adapted to rest upon said portion of the stove, means on said rear legs for removably securing said frame in place on the stove, and a tray removably seated in said open top.

GEORGE A. McGEE.

REFERENCES CITED

The following references are of record in the file of this patent:

UNITED STATES PATENTS

| Number | Name | Date |
|---|---|---|
| 488,247 | Loebs | Dec. 20, 1892 |
| 608,523 | Lucas | Aug. 2, 1898 |
| 916,785 | Rowell | Mar. 30, 1909 |
| 1,758,693 | France | May 13, 1930 |
| 1,903,262 | Goings | Mar. 28, 1933 |
| 1,925,500 | Richard | Sept. 5, 1933 |

FOREIGN PATENTS

| Number | Country | Date |
|---|---|---|
| 19,384 | Great Britain | 1893 |